Patented Mar. 20, 1951

2,546,036

UNITED STATES PATENT OFFICE 2,546,036

METHOD OF PREPARATION OF DIMETHYL SILICONE GUMS

James Marsden, Schenectady, N. Y., assignor to General Electric Company, a corporation of New York No Drawing. Application June 11, 1946, Serial No. 676,105

3 Claims. (Cl. 260—46.5)

This invention is concerned with the preparation of synthetic elastic compositions comprising dimethyl silicone gums. More particularly, the invention is concerned with a method of making an elastic gum which comprises contacting a dimethyl silicone (dimethyl polysiloxane), preferably a liquid dimethyl silicone, with sodium hydroxide.

One of the more specific embodiments of my invention comprises treating a dimethyl silicone with sodium hydroxide for a length of time and at a temperature sufficient to convert the said dimethyl silicone to a product having elastic properties, compounding the said product with a filler and a curing or vulcanizing agent and thereafter advancing the cure of the filled material under the influence of heat.

The invention is based on my discovery that elastic gums may be prepared by suitable treatment of dimethyl silicones; also that such elastic gums may be compounded with fillers, cure accelerators, etc., and molded or extruded to form products exhibiting many of the physical characteristics, such as elasticity, compressibility, etc., of known natural rubber and other synthetic elastomers. The products are characterized by their flexibility at low temperatures and particularly by their heat-resistance. The synthetic dimethyl silicone elastomers made from these elastic gums retain their tensile strengths, elongation or stretch, flexibility, etc., even when heated for long periods of time at elevated temperatures, e. g., from 150° to 200° C., without deterioration.

The dimethyl silicones found suitable for the preparation of the elastic gums as well as the synthetic elastomers possessing the above-mentioned properties are those obtained, e. g., by the hydrolysis of a pure or substantially pure dimethyl dihalogenosilane, e. g., dimethyl dichlorosilane, or a dimethyl-substituted-silane (the methyl groups being joined to the silicon atoms through carbon atoms), whose other two valences are satisfied by radicals which themselves are readily hydrolyzable, for instance hydrogen, amino, alkoxy, aroxy, acyloxy, etc., radicals. While the term "dimethyl silicone" has been broadly used to designate complex condensation products containing an average of two methyl groups per silicon atom, it is used herein and in the appended claims to mean a silicone (polysiloxane) in which all or substantially all of the silicon atoms are each connected to two methyl groups.

Various methods may be employed to prepare the dimethyl silicones used in the practice of this invention. For example, substantially pure dimethyl dichlorosilane or dimethyl dichlorosilane containing up to about 2 mol per cent methyl trihalogenosilane, more specifically methyl trichlorosilane, is hydrolyzed in manners now well known in the art to yield an oily, liquid, polymeric dimethylsiloxane containing up to 2 mol per cent copolymerized monomethylsiloxane. The oily hydrolysis product may be fractionally distilled to remove the low-boiling materials (trimers, tetramers, etc.) thereby to obtain the higher molecular weight liquid dimethyl silicones which may then be contacted with the sodium hydroxide to convert it to a dimethyl silicone gum or solid, elastic methyl polysiloxane. Optimum properties of the dimethyl silicone gum, as well as of the dimethyl silicone elastomer, are obtained from hydrolysis products of a mixture comprising substantially dimethyl dichlorosilane and not more than 0.5 mol per cent methyl trichlorosilane. Stated alternatively, hydrolysis products found useful in the practice of my invention, and hereinafter generically referred to as "dimethyl silicones," are those having a methyl-to-silicon ratio of from about 1.98, preferably 1.995 to 2 methyl groups per silicon atom.

More specific directions for the preparation of the dimethyl silicones may be found, e. g., in the copending Patnode applications Serial Nos. 463,813 and 463,815 (now both abandoned), filed October 29, 1942; and in Agens application Serial No. 526,473, filed March 14, 1944, now U. S. Patent 2,448,756, issued September 7, 1948. All the foregoing applications have been assigned to the same assignee as the present invention.

The transformation of the liquid, oily or crystalline dimethyl silicones to a solid, elastic, curable methylpolysiloxane in accordance with my invention is not exactly understood, but it is believed to be due to a rearrangement of the repetitive units

of the dimethyl silicone into polymers of extremely high molecular weight, which polymers may be best described as elastic gums or, more specifically, dimethyl silicone gums. The properties of these gums may be defined as being elastic, that is, compressible but capable of returning substantially to their original shape when the pressure is removed. Therefore, by my description of the elastic gums (including elastoplastic gums), I intend to exclude from the definition of "dimethyl silicone gums" or "elastic gums" all materials which are hard and brittle as such. However, it will be apparent to those skilled in the art that the formed elastic gums will include lower as well as higher molecular weight polymers which, if separated into their components, might yield materials varying in properties from thick, sticky masses to very firm, slightly compressible, though still elastic, fractions.

The transformation of the liquid dimethyl silicone to an elastic gum may be accomplished in a number of ways. One method comprises adding the sodium hydroxide to the dimethyl silicone and shaking the mass at normal temperatures for extended periods of time. To hasten the conversion of the dimethyl silicone, the mixture of the dimethyl silicone and the sodium hydroxide may be heated at temperatures ranging from substantially above room temperature up to about 150° C. The time required to convert the dimethyl silicone to the elastic gum stage will differ depending, for instance, upon the concentration of the sodium hydroxide, the type of dimethyl silicone employed, the temperature at which the conversion is being effected, etc. For example, at room temperatures, from about 2 to 10 or 15 days may be required to convert the dimethyl silicone to an elastic gum having suitable properties. At temperatures of the order of from 50° to 150° C., the conversion may be effected in from 10 to 96 hours.

The amount of sodium hydroxide employed also may be varied over wide limits, depending, e. g., upon the reaction conditions and the type of dimethyl silicone used. Thus, by weight, I may employ from 1 to as high as 20 or 30 per cent sodium hydroxide, based on the weight of the dimethyl silicone. Preferably, the amount of sodium hydroxide is from 2 to 10 per cent of the weight of the dimethyl silicone. Instead of adding the dry sodium hydroxide to the dimethyl silicone, the sodium hydroxide may first be dissolved in a small amount of water and the solution admixed with the dimethyl silicone. If small amounts of sodium hydroxide are employed, it is usually not essential that the sodium hydroxide be removed from the formed gum. However, if large amounts of sodium hydroxide are used in the conversion of the dimethyl silicone to a dimethyl silicone gum, it is preferable that the excess sodium hydroxide be substantially removed, e. g., by washing the gum with water.

To prepare the synthetic elastomers (synthetic dimethyl silicone elastomers or silicone rubbers), the elastic gum is worked on ordinary mixing (differential) rolls used in milling rubber until it attains the desired consistency for molding or extruding. Various fillers, e. g., titanium dioxide, and cure accelerators, e. g., benzoyl peroxide in an amount equal to from about 0.5 to 5 or 6 per cent, by weight of the dimethyl silicone gum, may be incorporated during this operation. After being formed into the desired shape, e. g., under heat and pressure, the cured synthetic dimethyl silicone elastomer may be further cured or vulcanized by heating in an oven until the desired degree of cure is obtained. The latter heat treatment, in many cases, increases the strength properties of the synthetic elastomer.

The liquid dimethyl silicone which I may use as the starting material may be obtained by several methods. For example, pure or substantially pure dimethyl dichlorosilane may be hydrolyzed in water or in other mediums disclosed in the aforementioned Patnode and Agens applications (supra). Although the method of hydrolysis is not critical, I prefer to use a procedure which yields a liquid product containing a minimum of low-boiling polymers.

In order that those skilled in the art may better understand how the present invention may be practiced, the following examples thereof are given by way of illustration and not by way of limitation. All parts are by weight.

*Example 1*

A dimethyl silicone was prepared by slowly adding about 300 parts of methyl chlorosilane comprising substantially pure dimethyl dichlorosilane (containing less than 1 mol per cent methyl trichlorosilane) to an amount of water in excess of that required to hydrolyze the aforementioned methyl chlorosilane. The oily layer which formed was separated, washed with water, and dried with sodium carbonate. To 100 parts of this dimethyl silicone was added 10 parts sodium hydroxide. The mixture was allowed to stand at room temperature for 40 hours, during which time it was shaken periodically. At the end of this time, the liquid dimethyl silicone was converted to a solid elastic product.

A synthetic dimethyl silicone elastomer was prepared by rolling on a cold mill a mixture of ingredients consisting of 92 parts of the above-described elastic gum, 184 parts titanium dioxide, and 2 parts benzoyl peroxide. After milling for about 30 minutes, at the end of which time the ingredients were intimately dispersed in the elastic gum, the mass was removed from the rolls and pressed into the form of a sheet at about 150° C. for 10 minutes under a pressure of approximately 500 pounds per square inch. The sheet was then cured further by heating at 200° C. for 12 hours. The cured sheet, which was soft and firm, but pliable, had a tensile strength of about 310 pounds per square inch, a per cent elongation at break of about 100% and a Shore hardness of 40.

*Example 2*

Another dimethyl silicone was prepared by slowly adding about 300 parts of a mixture containing substantially pure dimethyl dichlorosilane and about 0.2 mol per cent methyl trichlorosilane to an amount of water sufficient to hydrolyze the aforementioned mixture. The oily layer which formed was separated, washed with water, and dried with sodium carbonate. To 100 parts of this dimethyl silicone oil was added 1 part sodium hydroxide and the mixture heated for 5 hours at approximately 123° C. A highly viscous polymer formed which, after exposure to the air for 9 days, yielded a tough, elastic product.

A synthetic dimethyl silicone elastomer was prepared by rolling on a cold mill a mixture of ingredients consisting of 100 parts of the aforementioned elastic gum, 200 parts titamium dioxide, and 2 parts benzoyl peroxide dissolved in a small amount of toluene. After about 30 minutes' milling, the homogeneous sheet thereby obtained was removed from the rolls and pressed into the form of a sheet at about 150° C. for 10 minutes under a pressure of approximately 500 pounds per square inch. The tensile strength of this molded sheet was tested immediately after molding and after heat-treating at elevated temperatures with the following results:

| Cure | Hardness | Per Cent Elongation | Tensile |
|---|---|---|---|
| | | | Lbs./sq. in. |
| None | 39 | 200 | 348 |
| 3 hours at 200° C | 50 | 150 | 455 |
| 15 hours at 150° C | 50 | 150 | 510 |

It will be understood by those skilled in the art that fillers other than the one disclosed in the foregoing examples may also be used. These include lithopone, zinc oxide, talc, ferric oxide, and other finely divided solid materials often employed as fillers for known natural and synthetic rubbers.

The dimethyl silicone gums and the synthetic dimethyl silicone elastomers prepared therefrom are useful in applications where materials having elastic-like (rubber-like) properties are required, for instance, for gaskets, electrical conductor insulation, shock absorbers, etc. Owing to their extraordinary resistance to deterioration at elevated temperatures, they are partcularly useful in applications where natural rubber or other synthetic elastomers (rubbers) fail due to the deleterious effect of heat. The synthetic dimethyl silicone elastomers prepared from the dimethyl silicone gums made according to my invention are further endowed with the property of retaining their flexibility at low temperatures.

What I claim as new and desire to secure by Letters Patent of the United States is:

1. The process of producing a solid, elastic, curable methylpolysiloxane which comprises treating at a temperature ranging from room temperature to 150° C. with sodium hydroxide, until a solid, elastic product is obtained, a liquid methylpolysiloxane having a methyl-to-silicon ratio of from 1.98 to 2.0 methyl groups per silicon atom and consisting of polymerized dimethylsiloxane containing up to 2 mol per cent copolymerized monomethylsiloxane, the said sodium hydroxide being present, by weight, in an amount equal to from 1 to 30 per cent of the weight of the aforementioned liquid methylpolysiloxane.

2. The process of making a solid, elastic, curable methylpolysiloxane containing an average of from 1.98 to 2.0 methyl groups per silicon atom, which process comprises contacting with sodium hydroxide, until a solid, elastic product is obtained, a liquid polymeric dimethylsiloxane containing an average of from 1.98 to 2.0 methyl groups per silicon atom and containing up to 2 mol per cent copolymerized monomethylsiloxane, the said sodium hydroxide being present, by weight, in an amount equal to from 1 to 30 per cent based on the weight of the liquid methylpolysiloxane, the said contacting being conducted at a temperature of from room temperature up to 150° C. for from 2 to 15 days until a solid, elastic product is obtained.

3. The process of making a solid, elastic, curable methylpolysiloxane containing an average of from 1.98 to 2.0 methyl groups per silicon atom, which process comprises (1) treating a liquid polymeric dimethylsiloxane containing an average of from 1.98 to 2.0 methyl groups per silicon atom and containing up to 2 mol per cent copolymerized monomethylsiloxane with from 1 to 30 per cent, by weight, sodium hydroxide based on the weight of the liquid methylpolysiloxane, the said treatment being conducted for from 2 to 15 days at a temperature ranging from room temperature to 150° C. until a solid, elastic product is obtained, (2) compounding the said product with a filler and benzoyl peroxide and (3) advancing the cure of the filled material by the application of heat.

JAMES MARSDEN.

REFERENCES CITED

The following references are of record in the file of this patent:

UNITED STATES PATENTS

| Number | Name | Date |
|---|---|---|
| 2,392,713 | Wright et al. | Jan. 8, 1946 |
| 2,432,665 | Hyde | Dec. 16, 1947 |
| 2,441,422 | Krieble et al. | May 11, 1948 |
| 2,443,353 | Hyde et al. | June 15, 1948 |
| 2,481,052 | Warrick | Sept. 6, 1949 |
| 2,490,357 | Hyde | Dec. 6, 1949 |

FOREIGN PATENTS

| Number | Country | Date |
|---|---|---|
| 119,843 | Australia | Aug. 2, 1945 |